(12) United States Patent
Austin et al.

(10) Patent No.: US 8,996,031 B2
(45) Date of Patent: *Mar. 31, 2015

(54) LOCATION ESTIMATION OF A MOBILE DEVICE IN A UMTS NETWORK

(71) Applicant: AT&T Mobility II LLC, Atlanta, GA (US)

(72) Inventors: Mark Austin, Roswell, GA (US); Jeremy Fix, Acworth, GA (US); Sheldon Meredith, Marietta, GA (US); Sarat Puthenpura, Berkeley Heights, NJ (US); Gopalakrishnan Meempat, East Brunswick, NJ (US)

(73) Assignee: AT&T Mobility II LLC, Atlanta, GA (US)

( * ) Notice: Subject to any disclaimer, the term of this patent is extended or adjusted under 35 U.S.C. 154(b) by 76 days.

This patent is subject to a terminal disclaimer.

(21) Appl. No.: 13/866,909

(22) Filed: Apr. 19, 2013

(65) Prior Publication Data

US 2013/0310065 A1    Nov. 21, 2013

Related U.S. Application Data

(63) Continuation of application No. 12/870,254, filed on Aug. 27, 2010, now Pat. No. 8,447,328.

(51) Int. Cl.
*H04W 24/00* (2009.01)
*G01S 5/10* (2006.01)
(Continued)

(52) U.S. Cl.
CPC ................ *G01S 5/10* (2013.01); *G01S 5/0063* (2013.01); *G01S 5/0236* (2013.01); *G01S 5/0242* (2013.01)
USPC ...................................................... 455/456.1

(58) Field of Classification Search
USPC ........ 455/456.2, 456.1, 436, 456.6, 434, 424; 370/321, 342, 346
See application file for complete search history.

(56) References Cited

U.S. PATENT DOCUMENTS

| 4,718,081 A | 1/1988 | Brenig |
| 5,515,062 A | 5/1996 | Maine et al. |

(Continued)

FOREIGN PATENT DOCUMENTS

| EP | 0856746 A2 | 8/1998 |
| JP | 2004069609 A | 3/2004 |

(Continued)

OTHER PUBLICATIONS

Office Action dated Jul. 22, 2014 for U.S. Appl. No. 12/958,146, 38 Pages.

(Continued)

*Primary Examiner* — Kiet Doan
(74) *Attorney, Agent, or Firm* — Amin, Turocy & Watson, LLP

(57) ABSTRACT

The present disclosure provides devices, systems, and methods to utilize relative timing offset information reported by one or more mobile devices. When coupled with AGPS information reported by one or more mobile devices, the offset information is be used to calibrate calculations and subsequently to locate all 3G mobiles with GPS-like accuracy, whether or not a GPS receiver is available on said mobile device being located. A determination of a propagation delay between one or more cell sites and a mobile device is reported to a network and used to calibrate unknown information such as a timing offset, to improve the accuracy of a detected location. The relative timing offset can be applied to determine a location for all other mobile devices within the area served by the known base station. The present disclosure utilizes this method in conjunction with information crowdsourced from a plurality of mobile devices.

20 Claims, 3 Drawing Sheets

(51) Int. Cl.
*G01S 5/00* (2006.01)
*G01S 5/02* (2010.01)

(56) References Cited

U.S. PATENT DOCUMENTS

| | | |
|---|---|---|
| 5,724,660 A | 3/1998 | Kauser et al. |
| 5,732,354 A | 3/1998 | MacDonald |
| 5,732,383 A | 3/1998 | Foladare et al. |
| 5,844,521 A | 12/1998 | Stephens et al. |
| 5,982,324 A | 11/1999 | Watters et al. |
| 6,018,312 A | 1/2000 | Haworth et al. |
| 6,026,301 A | 2/2000 | Satarasinghe |
| 6,108,532 A | 8/2000 | Matsuda et al. |
| 6,108,556 A | 8/2000 | Ito |
| 6,125,125 A | 9/2000 | Narasimha et al. |
| 6,148,219 A | 11/2000 | Engelbrecht et al. |
| 6,216,002 B1 | 4/2001 | Holmring |
| 6,230,018 B1 | 5/2001 | Watters et al. |
| 6,256,577 B1 | 7/2001 | Graunke |
| 6,263,190 B1 | 7/2001 | Mamori et al. |
| 6,298,233 B1 | 10/2001 | Souissi et al. |
| 6,307,503 B1 | 10/2001 | Liu et al. |
| 6,311,078 B1 | 10/2001 | Hardouin et al. |
| 6,317,686 B1 | 11/2001 | Ran |
| 6,330,459 B1 | 12/2001 | Crichton et al. |
| 6,351,235 B1 | 2/2002 | Stilp |
| 6,353,778 B1 | 3/2002 | Brown et al. |
| 6,397,074 B1 | 5/2002 | Pihl et al. |
| 6,405,047 B1 | 6/2002 | Moon |
| 6,407,703 B1 | 6/2002 | Minter et al. |
| 6,429,815 B1 | 8/2002 | Soliman |
| 6,434,396 B1 | 8/2002 | Rune |
| 6,453,168 B1 | 9/2002 | McCrady et al. |
| 6,493,539 B1 | 12/2002 | Falco et al. |
| 6,515,623 B2 | 2/2003 | Johnson |
| 6,522,296 B2 | 2/2003 | Holt |
| 6,526,335 B1 | 2/2003 | Treyz et al. |
| 6,560,532 B2 | 5/2003 | Cayford |
| 6,560,567 B1 | 5/2003 | Yechuri et al. |
| 6,594,576 B2 | 7/2003 | Fan et al. |
| 6,604,083 B1 | 8/2003 | Bailey et al. |
| 6,668,226 B2 | 12/2003 | Sutanto et al. |
| 6,690,292 B1 | 2/2004 | Meadows et al. |
| 6,744,383 B1 | 6/2004 | Alfred et al. |
| 6,744,740 B2 | 6/2004 | Chen |
| 6,801,782 B2 | 10/2004 | McCrady et al. |
| 6,801,855 B1 | 10/2004 | Walters et al. |
| 6,816,782 B1 | 11/2004 | Walters et al. |
| 6,850,761 B2 | 2/2005 | Pallonen |
| 6,892,054 B2 | 5/2005 | Belcher et al. |
| 6,933,100 B2 | 8/2005 | Igawa et al. |
| 6,933,860 B1 | 8/2005 | Gehman et al. |
| 7,065,349 B2 | 6/2006 | Nath et al. |
| 7,098,805 B2 | 8/2006 | Meadows et al. |
| 7,113,793 B2 | 9/2006 | Veerasamy et al. |
| 7,149,534 B2 | 12/2006 | Bloebaum et al. |
| 7,181,218 B2 | 2/2007 | Ovesjo et al. |
| 7,277,049 B2 | 10/2007 | Korneluk et al. |
| 7,289,039 B2 | 10/2007 | Kato et al. |
| 7,346,359 B2 | 3/2008 | Damarla et al. |
| 7,359,719 B1 | 4/2008 | Duffett-Smith et al. |
| 7,366,492 B1 | 4/2008 | Ganesh |
| 7,375,649 B2 | 5/2008 | Gueziec |
| 7,432,829 B2 | 10/2008 | Poltorak |
| 7,436,794 B2 | 10/2008 | Takahashi et al. |
| 7,508,321 B2 | 3/2009 | Gueziec |
| 7,664,492 B1 | 2/2010 | Lee et al. |
| 7,696,922 B2 | 4/2010 | Nicholson et al. |
| 7,697,917 B2 | 4/2010 | Camp et al. |
| 7,706,964 B2 | 4/2010 | Horvitz et al. |
| 7,744,740 B2 | 6/2010 | Diehl |
| 7,747,258 B2 | 6/2010 | Farmer et al. |
| 7,761,225 B2 | 7/2010 | Vaughn |
| 7,831,380 B2 | 11/2010 | Chapman et al. |
| 7,848,880 B2 | 12/2010 | Cheung |
| 7,890,299 B2 | 2/2011 | Fok et al. |
| 7,917,156 B2 | 3/2011 | Sheynblat et al. |
| 7,945,271 B1 | 5/2011 | Barnes et al. |
| 7,962,162 B2 | 6/2011 | McNair |
| 7,962,280 B2 | 6/2011 | Kindo et al. |
| 7,994,981 B1 | 8/2011 | Farrokhi et al. |
| 7,996,020 B1 | 8/2011 | Chhabra |
| 8,000,726 B2 | 8/2011 | Altman et al. |
| 8,005,050 B2 | 8/2011 | Scheinert et al. |
| 8,010,164 B1 | 8/2011 | Sennett et al. |
| 8,036,822 B2 | 10/2011 | Ho et al. |
| 8,054,802 B2 | 11/2011 | Burgess et al. |
| 8,121,604 B1 | 2/2012 | Schwinghammer |
| 8,140,079 B2 | 3/2012 | Olson |
| 8,193,984 B2 | 6/2012 | Ward et al. |
| 8,194,589 B2 | 6/2012 | Wynn et al. |
| 8,195,175 B2 | 6/2012 | Govindan et al. |
| 8,224,349 B2 | 7/2012 | Meredith et al. |
| 8,253,559 B2 | 8/2012 | Howard et al. |
| 8,254,959 B2 | 8/2012 | Fix et al. |
| 8,264,956 B2 | 9/2012 | Ramankutty et al. |
| 8,270,933 B2 | 9/2012 | Riemer et al. |
| 8,280,438 B2 | 10/2012 | Barbera et al. |
| 8,295,854 B2 | 10/2012 | Osann et al. |
| 8,355,364 B1 | 1/2013 | Vargantwar et al. |
| 8,355,865 B2 | 1/2013 | Wagner et al. |
| 8,417,264 B1 | 4/2013 | Whitney et al. |
| 8,666,388 B2 | 3/2014 | Catovic et al. |
| 8,666,390 B2 | 3/2014 | Meredith et al. |
| 2001/0047242 A1 | 11/2001 | Ohta |
| 2002/0059266 A1 | 5/2002 | I'anson et al. |
| 2002/0069312 A1 | 6/2002 | Jones |
| 2002/0077116 A1 | 6/2002 | Havinis et al. |
| 2002/0172223 A1 | 11/2002 | Stilp et al. |
| 2003/0092448 A1 | 5/2003 | Forstrom et al. |
| 2003/0097330 A1 | 5/2003 | Hillmer et al. |
| 2003/0115260 A1 | 6/2003 | Edge |
| 2003/0125046 A1 | 7/2003 | Riley et al. |
| 2003/0222819 A1 | 12/2003 | Karr et al. |
| 2003/0225508 A9 | 12/2003 | Petzld et al. |
| 2004/0067759 A1 | 4/2004 | Spirito et al. |
| 2004/0082338 A1 | 4/2004 | Norrgard et al. |
| 2004/0127191 A1 | 7/2004 | Matsunaga |
| 2004/0131036 A1 | 7/2004 | Walsh |
| 2004/0155814 A1 | 8/2004 | Bascobert |
| 2004/0172190 A1 | 9/2004 | Tsunehara et al. |
| 2004/0219930 A1 | 11/2004 | Lin |
| 2004/0224698 A1 | 11/2004 | Yi et al. |
| 2005/0007993 A1 | 1/2005 | Chambers et al. |
| 2005/0039056 A1 | 2/2005 | Bagga et al. |
| 2005/0053099 A1 | 3/2005 | Spear et al. |
| 2005/0136911 A1 | 6/2005 | Csapo et al. |
| 2005/0239410 A1 | 10/2005 | Rochester |
| 2005/0272445 A1 | 12/2005 | Zellner et al. |
| 2005/0276385 A1 | 12/2005 | McCormick et al. |
| 2006/0030333 A1 | 2/2006 | Ward et al. |
| 2006/0046744 A1 | 3/2006 | Dublish et al. |
| 2006/0075131 A1 | 4/2006 | Douglas et al. |
| 2006/0089153 A1 | 4/2006 | Sheynblat |
| 2006/0240839 A1 | 10/2006 | Chen et al. |
| 2006/0267841 A1 | 11/2006 | Lee et al. |
| 2006/0270419 A1 | 11/2006 | Crowley et al. |
| 2006/0282660 A1 | 12/2006 | Varghese et al. |
| 2007/0001873 A1 | 1/2007 | Ishikawa et al. |
| 2007/0060130 A1 | 3/2007 | Gogic et al. |
| 2007/0176749 A1 | 8/2007 | Boyd |
| 2007/0213074 A1 | 9/2007 | Fitch et al. |
| 2007/0217375 A1 | 9/2007 | Zampiello et al. |
| 2007/0217379 A1 | 9/2007 | Fujiwara et al. |
| 2007/0293157 A1 | 12/2007 | Haartsen et al. |
| 2007/0298807 A1 | 12/2007 | Yarkosky |
| 2008/0004789 A1 | 1/2008 | Horvitz et al. |
| 2008/0010365 A1 | 1/2008 | Schneider |
| 2008/0070593 A1 | 3/2008 | Altman et al. |
| 2008/0071466 A1 | 3/2008 | Downs et al. |
| 2008/0076450 A1 | 3/2008 | Nanda et al. |
| 2008/0096566 A1 | 4/2008 | Brunner et al. |
| 2008/0133730 A1 | 6/2008 | Park et al. |
| 2008/0186234 A1 | 8/2008 | Alles et al. |

(56) References Cited

U.S. PATENT DOCUMENTS

| | | |
|---|---|---|
| 2008/0192682 A1 | 8/2008 | Matsumoto et al. |
| 2008/0274750 A1 | 11/2008 | Carlson et al. |
| 2008/0305832 A1 | 12/2008 | Greenberg |
| 2008/0311923 A1 | 12/2008 | Petrovic et al. |
| 2009/0024546 A1 | 1/2009 | Ficcaglia et al. |
| 2009/0052330 A1 | 2/2009 | Matsunaga et al. |
| 2009/0079622 A1 | 3/2009 | Seshadri et al. |
| 2009/0104917 A1 | 4/2009 | Ben Rached et al. |
| 2009/0117907 A1 | 5/2009 | Wigren et al. |
| 2009/0131073 A1 | 5/2009 | Carlson et al. |
| 2009/0181695 A1 | 7/2009 | Wirola et al. |
| 2009/0260055 A1 | 10/2009 | Parmar |
| 2009/0280828 A1 | 11/2009 | Wang et al. |
| 2009/0286510 A1 | 11/2009 | Huber et al. |
| 2009/0287922 A1 | 11/2009 | Herwono et al. |
| 2009/0310501 A1 | 12/2009 | Catovic et al. |
| 2009/0327134 A1 | 12/2009 | Carlson et al. |
| 2010/0020776 A1 | 1/2010 | Youssef et al. |
| 2010/0054237 A1 | 3/2010 | Han et al. |
| 2010/0058442 A1 | 3/2010 | Costa et al. |
| 2010/0081389 A1 | 4/2010 | Lawrow |
| 2010/0100732 A1 | 4/2010 | Hatakeyama et al. |
| 2010/0113035 A1 | 5/2010 | Eskicioglu et al. |
| 2010/0120447 A1 | 5/2010 | Anderson et al. |
| 2010/0124931 A1 | 5/2010 | Eskicioglu et al. |
| 2010/0135178 A1 | 6/2010 | Aggarwal et al. |
| 2010/0144368 A1 | 6/2010 | Sullivan |
| 2010/0159951 A1 | 6/2010 | Shkedi et al. |
| 2010/0172259 A1 | 7/2010 | Aggarwal et al. |
| 2010/0189236 A1 | 7/2010 | MacDonald et al. |
| 2010/0190509 A1 | 7/2010 | Davis et al. |
| 2010/0195566 A1* | 8/2010 | Krishnamurthy et al. ..... 370/328 |
| 2010/0203903 A1 | 8/2010 | Dingler et al. |
| 2010/0207470 A1 | 8/2010 | Kim et al. |
| 2010/0220665 A1 | 9/2010 | Govindan et al. |
| 2010/0222075 A1 | 9/2010 | Miura |
| 2010/0227589 A1 | 9/2010 | Cook et al. |
| 2010/0250542 A1 | 9/2010 | Fujimaki |
| 2010/0299060 A1 | 11/2010 | Snavely et al. |
| 2010/0311437 A1 | 12/2010 | Palanki et al. |
| 2010/0313157 A1 | 12/2010 | Carlsson et al. |
| 2010/0323723 A1 | 12/2010 | Gerstenberger et al. |
| 2010/0331013 A1 | 12/2010 | Zhang |
| 2011/0009068 A1 | 1/2011 | Miura |
| 2011/0010085 A1 | 1/2011 | Tanaka et al. |
| 2011/0023129 A1 | 1/2011 | Vernal |
| 2011/0053609 A1 | 3/2011 | Choi-Grogan |
| 2011/0060808 A1 | 3/2011 | Martin et al. |
| 2011/0065450 A1 | 3/2011 | Kazmi |
| 2011/0072034 A1 | 3/2011 | Sly |
| 2011/0076975 A1 | 3/2011 | Kim et al. |
| 2011/0077032 A1 | 3/2011 | Correale et al. |
| 2011/0161261 A1 | 6/2011 | Wu et al. |
| 2011/0164596 A1 | 7/2011 | Montemurro et al. |
| 2011/0171912 A1 | 7/2011 | Beck et al. |
| 2011/0172905 A1 | 7/2011 | Schroder et al. |
| 2011/0205964 A1 | 8/2011 | Fix et al. |
| 2011/0207470 A1 | 8/2011 | Meredith et al. |
| 2011/0210843 A1* | 9/2011 | Kummetz ............... 340/517 |
| 2011/0210849 A1 | 9/2011 | Howard et al. |
| 2011/0244879 A1 | 10/2011 | Siomina et al. |
| 2011/0271331 A1 | 11/2011 | Adams |
| 2011/0296169 A1 | 12/2011 | Palmer |
| 2011/0319098 A1 | 12/2011 | Potorny et al. |
| 2012/0016902 A1 | 1/2012 | Ranjan et al. |
| 2012/0025976 A1 | 2/2012 | Richey et al. |
| 2012/0028650 A1 | 2/2012 | Cooper et al. |
| 2012/0030083 A1 | 2/2012 | Newman et al. |
| 2012/0032855 A1* | 2/2012 | Reede et al. ............. 342/458 |
| 2012/0062415 A1 | 3/2012 | Hwang et al. |
| 2012/0087338 A1 | 4/2012 | Brandt et al. |
| 2012/0139782 A1 | 6/2012 | Gutt et al. |
| 2012/0158289 A1 | 6/2012 | Bernheim Brush et al. |
| 2012/0182874 A1 | 7/2012 | Siomina et al. |
| 2012/0317500 A1 | 12/2012 | Kosseifi et al. |
| 2012/0323703 A1 | 12/2012 | Hillier et al. |
| 2013/0007058 A1 | 1/2013 | Meredith et al. |
| 2013/0023237 A1 | 1/2013 | Meredith et al. |
| 2013/0023274 A1 | 1/2013 | Meredith et al. |
| 2013/0023281 A1 | 1/2013 | Meredith et al. |
| 2013/0281111 A1 | 10/2013 | Syrjarinne et al. |
| 2013/0324149 A1 | 12/2013 | Fix et al. |
| 2014/0062782 A1 | 3/2014 | Abraham |
| 2014/0171060 A1 | 6/2014 | Cook et al. |

FOREIGN PATENT DOCUMENTS

| | | |
|---|---|---|
| JP | 2007328050 A | 12/2007 |
| WO | WO2006031035 A1 | 3/2006 |

OTHER PUBLICATIONS

Notice of Allowance dated Jul. 22, 2014 for U.S. Appl. No. 13/525,065, 82 Pages.

Notice of Allowance dated Jul. 7, 2014 for U.S. Appl. No. 13/188,295, 51 pages.

Notice of Allowance dated Jul. 22, 2014 for U.S. Appl. No. 13/188,300, 49 Pages.

Office Action dated Aug. 8, 2014 for U.S. Appl. No. 13/284,497, 48 pages.

Office Action dated Aug. 11, 2014 for U.S. Appl. No. 14/279,176, 22 pages.

Intelligent Transportation System. Published online http://en.wikipedia.org/wiki/Intelligent_transportation_system, retrieved on Aug. 15, 2011, 7 pages.

Koukoumidis Emmanouil, Peh Li-Shiuan, Martonosi Margaret, SignalGuru: Leveraging Mobile Phones for Collaborative Traffic Signal Schedule Advisory, MobiSys'11, Jun. 28-Jul. 1, 2011, Bethesda, Maryland, USA. 14 pages.

3rd Generation Partnership Project, Technical Specification, "Group Radio Access Network, UTRAN Iuh interface Home Node B Application Part (HNBAP) signalling (Release 8)", 3GPP TS 25.469 V8.0.0 (Dec. 2008), last viewed Jul. 1, 2009, 56 pages.

Office Action dated Sep. 20, 2012 for U.S. Appl. No. 12/870,254, 29 pages.

3rd Generation Partnership Project, Technical Specification, "Group GSM/EDGE Radio Access Network, Radio subsystem synchronization (Release 8)", 3GPP TS 45.010 V8.0.0 (May 2008), last viewed Jul. 1, 2009, 30 pages.

3rd Generation Partnership Project, Technical Specification, "Group Radio Access Network, UTRAN Iuh interface Node B Application Part (NBAP) signalling (Release 8)", 3GPP TS 25.469 V8.0.0 (Dec. 2008), last viewed Jul. 1, 2009, 56 pages.

Sullivan, Mark. "Signs and Wonders: Is AT&T Stepping Up Its Game?" PC World, Dec. 10, 2009, 1 page.

ETSI TS 125 215 V6.4.0 (Sep. 2005). Universal Mobile Telecommunications System (UMTS), Physical layer, Measurements (FDD), 3GPP TS 25.215 version 6.4.0 Release 6). Last accessed Jun. 18, 2010, 20 pages.

ETSI TS 125 331 V6.9.0 (Mar. 2006). Universal Mobile Telecommunications System (UMTS), Radio Resource Control (RRC) protocol specification, (3GPP TS 25.331 version 6.9.0 Release 6). Last accessed Jun. 18, 2010, 1211 pages.

New Devices Aim to Disable Cell Phones While Driving. FOXNews.com, Jan. 18, 2009. http://www.foxnews.com/printer_friendly_story/0,3566,480585,00.html. Last accessed Nov. 24, 2010, 2 pages.

Cortes, et al. "Support-Vector Networks", Machine Learning, 20, 1995. http://www.springerlink.com/content/k238jx04hm87j80g/fulltext.pdf. Last accessed Dec. 24, 2010, 25 pages.

ACM Website, Press release of Mar. 17, 2009. http://www.acm.org/press-room/news-releases/pdfs/awards-08-groupa1.pdf. Last accessed Dec. 24, 2010, 3 pages.

"Boser, et al. A training algorithm for optimal margin classifiers. In D. Haussler, editor, 5th Annual ACM Workshop on COLT, pp. 144-152, Pittsburgh, PA, 1992. ACM Press.http://citeseerx.ist.psu.edu/viewdoc/summary?doi=10.1.1.21.3818. Last accessed Dec. 24, 2010, 9 pages."

"Hsu, et al. A Practical Guide to Support Vector Classification. Department of Computer Science National Taiwan University, Last

(56) References Cited

OTHER PUBLICATIONS updated: Apr. 15, 2010.http://www.csie.ntu.edu.tw/~cjlin/papers/guide/guide.pdf. Last accessed Dec. 24, 2010, 16 pages."
"Drucker, et al. Support Vector Regression Machines.http://scholar.google.com/scholar?q=%22Support+Vector+Regression+Machines.%22. Last accessed Dec. 24, 2010, 7 pages."
Suykens et al., "Least squares support vector machine classifiers", Neural Processing Letters, vol. 9, No. 3, Jun. 1999, pp. 293-300.
Ferris et al. (2002). "Interior-point methods for massive support vector machines". SIAM Journal on Optimization 13: 783-804. doi:10.1137/S1052623400374379.
Meyer et al. "The support vector machine under test." Neurocomputing 55(1-2): 169-186, 2003.
International Search Report for PCT Application No. US2011/026122, dated Sep. 10, 2011, 11 pages.
International Search Report for PCT Application No. US2011/026120, dated Sep. 9, 2011 13 pages.
Charitanetra et al. "Mobile positioning location using E-OTD method for GSM network" Research and Development, 2003. Proceedings Student Conference on Putrajaya, Malaysia Aug. 25-26, 2003, pp. 319-324.
"Location Labs Powers Location-based Fraud Detection", All Points Blog, http://webcache.googleusercontent.com/search?hl=en&rlz=1R2GFRE_enUS398&q=cache:trsMn9Sin6wJ:http://apb.directionsmag.com/entry/location-labs-powers-location-based-fraud-detection/162802+http%3A//apb.directionsmag.com/entry/location-labs-powers-location-based- . . . 1&ct=clnk, Oct. 12, 2010.
"Location Based Fraud Detection", Finsphere Corporation, 2008-2010.
Fleishman. Using the Personal Hotspot on your AT & T iPhone. Published online Mar. 15, 2011. http://www.macworld.com/article/158556/2011/03/personal_hotspot_att . . . , 4 pages.
Fleischfresser. Never Stop at a Red-Light Again. Published online Aug. 30, 2011. http://www.smartplanet.com/blog/ . . . , 2 pages.
Cellphone Networks and the Future of Traffic. Published online Mar. 2, 2011. http://m.wired.com/autopia/2011/03/cell-phone-networks-and-the-future- . . . 15 pages.
Intelligent Transportation System. Published online http://en.wikipedia.org/wiki/Intelligent_transportation_system, 7 pages.
Koukoumidis Emmanouil, Peh Li-Shiuan, Martonosi Margaret, SignalGuru: Leveraging Mobile Phones for Collaborative Traffic Signal Schedule Advisory. 14 pages.
Bitcarrier Technology. Published online at http://www.bitcarrier.com/technology. Retrieved Aug. 15, 2011, 1 page.
Hao Peng, Ban Xuegang(Jeff). Estimating Vehicle Position in a Queue at Signalized Intersections Using Simple Travel Times from Mobile Sensors. Retrieved Nov. 18, 2011. 6 pages.
Ban Xuegang(Jeff), Gruteser Marco. Mobile Sensor as Traffic Probes: Addressing Transportation Modeling and Privacy Protection in an Integrated Framework. Dated Jan. 10, 2010. 17 pages.
Office Action dated Dec. 28, 2011 for U.S. Appl. No. 12/836,471, 34 pages.
Office Action dated Feb. 23, 2012 for U.S. Appl. No. 12/967,747, 31 pages.
Office Action dated Dec. 15, 2011 for U.S. Appl. No. 12/712,424, 34 pages.
Office Action dated Apr. 13, 2012 for U.S. Appl. No. 12/416,853, 36 pages.
Office Action dated Oct. 2, 2012 for U.S. Appl. No. 13/554,285, 19 pages.
Office Action dated Aug. 30, 2012 for U.S. Appl. No. 12/958,146, 40 pages.
MobileLutions Introduces MobiLoc-A Breakthrough Technology to Control Texting in the Mobile Workplace. Press release Oct. 10, 2010 by MobileLutions. 2 pages.
DriveAssist Frequently Ask question by Aegis Mobility, Wayback archive Jul. 12, 2010, 2 pages.
Office Action dated Jul. 30, 2012 for U.S. Appl. No. 12/967,747, 28 pages.
Office Action dated Jul. 17, 2012 for U.S. Appl. No. 13/220,083, 57 pages.
Office Action dated Sep. 11, 2012 for U.S. Appl. No. 13/188,345, 44 pages.
Office Action dated Oct. 15, 2012 for U.S. Appl. No. 13/523,778, 21 pages.
Office Action dated Dec. 20, 2012 for U.S. Appl. No. 12/958,146, 23 pages.
Office Action dated Dec. 28, 2012 for U.S. Appl. No. 13/188,295, 37 pages.
Office Action dated Jan. 3, 2013 for U.S. Appl. No. 13/188,300, 36 pages.
Office Action dated Nov. 8, 2012 for U.S. Appl. No. 13/204,535, 30 pages.
Final Office Action dated Jan. 25, 2013, for U.S. Appl. No. 13/554,285, 20 pgs.
Non-Final Office Action dated Mar. 19, 2013, for U.S. Appl. No. 13/174,541, 46 pgs.
Final Office Action dated Feb. 13, 2013, for U.S. Appl. No. 13/220,083, 48 pgs.
Final Office Action dated Feb. 22, 2013, for U.S. Appl. No. 13/188,345, 45 pgs.
Final Office Action dated Mar. 15, 2013, for U.S. Appl. No. 13/204,535, 18 pgs.
Non-Final Office Action dated Mar. 19, 2013, for U.S. Appl. No. 13/284,497, 46 pgs.
Non-Final Office Action dated Apr. 19, 2013, for U.S. Appl. No. 13/277,595, 58 pages.
Final Office Action dated Apr. 3, 2014 for U.S. Appl. No. 13/188,295, 37 pages.
Notice of Allowance mailed Aug. 12, 2013, for U.S. Appl. No. 13/174,541, 40 pages.
Final Office Action dated Aug. 2, 2013, for U.S. Appl. No. 13/188,295, 26 pages.
Final Office Action dated Aug. 2, 2013, for U.S. Appl. No. 13/188,300, 38 pages.
Non-Final Office Action dated Jun. 20, 2013, for U.S. Appl. No. 13/219,911, 61 pages.
Non-Final Office Action dated Jul. 17, 2013, for U.S. Appl. No. 13/188,345, 27 pages.
Non-Final Office Action dated Jun. 20, 2013, for U.S. Appl. No. 13/291,917, 52 pages.
Non-Final Office Action dated May 31, 2013, for U.S. Appl. No. 13/523,770, 40 pages.
Non-Final Office Action dated Sep. 19, 2013, for U.S. Appl. No. 13/927,020, 30 pages.
Non-Final Office Action dated Oct. 2, 2013 for U.S. Appl. No. 12/958,146, 31 pages.
Non-Final Office Action dated Sep. 26, 2013 for U.S. Appl. No. 13/284,456, 58 pages.
RouteFinder 3.00 for ArGIS Documentation, 2007, Routeware and Higher Mapping Solutions, 71 pages, downloaded from http://www.routeware.dk/download/routefinder_arcgis.pdf.
mySociety (Web page), "More travel-time maps and their uses", 2007, downloaded from http://www.mySociety.org/2007/more-travel-maps/, 10 pages total (including a single page Examiner's attachment showing the operation of the interactive travel-time map). Wayback machine archive from Jan. 21, 2009 of the mySociety Web page, "More travel-time maps and their uses", downloaded from http://web.archive.org/web/20090121193615/http://www.mysociety.org/2007/more-travel-maps/, 11 pages.
Street, Nicholas, "TimeContours: Using isochrone visualisation to describe transport network travel cost", Final Report, Jun. 14, 2006, Department of Computing Imperial College London, 97 pages. Downloaded from http://www.doc.ic.ac.uk/teaching/projects/Distinguished06/nicholasstreet.pdf.
Non-Final Office Action dated Nov. 5, 2013 for U.S. Appl. No. 13/188,136, 47 pages.
Final Office Action dated Sep. 18, 2013, for U.S. Appl. No. 13/284,497, 30 pages.
Final Office Action dated Aug. 22, 2013, for U.S. Appl. No. 13/277,595, 36 pages.

(56) References Cited

OTHER PUBLICATIONS

Final Office Action dated Oct. 21, 2013, for U.S. Appl. No. 13/523,770, 24 pages.
Office Action dated Nov. 5, 2013 for U.S. Appl. No. 13/188,345, 30 pages.
Non-Final Office Action dated Dec. 11, 2013, for U.S. Appl. No. 13/188,295, 52 pages.
Non-Final Office Action dated Dec. 24, 2013, for U.S. Appl. No. 13/188,300, 44 pages.
Final Office Action dated Dec. 11, 2013, for U.S. Appl. No. 13/291,917, 34 pages.
Final Office Action dated Jan. 15, 2014 for U.S. Appl. No. 13/219,911, 38 pages.
Final Office Action dated Jan. 28, 2014, for U.S. Appl. No. 12/958,146, 24 pages.
Notice of Allowance dated Feb. 14, 2014 for U.S. Appl. No. 13/284,456, 30 pages.
Final Office Action dated Feb. 24, 2014, for U.S. Appl. No. 13/927,020, 18 pages.
Office Action dated May 21, 2013 for U.S. Appl. No. 13/305,276, 28 pages.
Office Action dated Oct. 24, 2012 for U.S. Appl. No. 13/305,276, 37 pages.
"Locate your friends in real time with Google Latitude." http://googlemobile.blogspot.com/2009/02/locate-your-friends-in-real-time-with.html. Last accessed Mar. 8, 2012, 23 pages.
"Location sharing and updating." http://support.google.com/mobile/bin/answer.py?hl=en&answer=136647. Last accessed Mar. 8, 2012, 3 pages.
"Privacy Settings." http://support.google.com/mobile/bin/answer.py?hl=en&answer=136650, Last accessed Mar. 8, 2012, 1 page.
Office Action dated Nov. 25, 2013 for U.S. Appl. No. 13/447,069, 40 pages.
Office Action dated May 9, 2013 for U.S. Appl. No. 13/447,069, 33 pages.
Tsai, et al, "Location-Sharing Technologies: Privacy Risks and Controls." Feb. 2010. Retrieved on May 10, 2013, 26 pages.
Li et al, "Sharing Location in Online Social Networks". IEEE Network, Sep./Oct. 2010; 0890-8044/10/$25.00 (c)2010 IEEE. Retrieved on May 10, 2013, 6 pages.
Tsai, et al, "Who's Viewed You? The Impact of Feedback in a Mobile Location-Sharing Application". CHI 2009—Security and Privacy, Apr. 9, 2009—Boston, MA, USA. Retrieved on May 10, 2013, 10 pages.
Pettersen, et al., "Automatic antenna tilt control for capacity enhancement in UMTS FDD." Retrieved on Mar. 25, 2012, 5 pages.
Islam, et al., "Self-Optimization of Antenna Tilt and Pilot Power for Dedicated Channels." Retrieved on Mar. 25, 2012, 8 pages.
Bigham, et al., "Tilting and Beam-shaping for Traffic Load Balancing in WCDMA Network." Retrieved on Mar. 25, 2012, 4 pages.
3GPP TS 25.215 V6.4.0 (Sep. 2005) Physical Layer Measurements.
3GPP TS 25.331 V6.9.0 (Mar. 2006) RRC protocol for the UE-UTRAN radio interface.
3GPP TS 25.413 V6.9.0 (Mar. 2006) UTRAN Iu interface RANAP signalling.
Calabrese, et al., "Real-Time Urban Monitoring Using Cell Phones: A Case Study in Rome". IEEE Transactions on Intelligent Transportation Systems, 12 pages. (http://senseable.mit.edu/papers/pdf/2010_Calabrese_et_al_Rome_TITS.pdf). Retrieved on Sep. 29, 2012, 11 pages.
Smith, et al., "Airsage Overview", (http://mikeontraffic.typepad.com/files/raleigh-winter-2011-presentation-v11-final.pdf) Retrieved on Sep. 29, 2012, 39 pages.
Office Action dated Feb. 5, 2014 for U.S. Appl. No. 13/526,988, 56 pages.
Marko Silventoinen, Timo Rantalainen, "Mobile Station Locating in GSM" Helsinki, Finland, Last accessed on Nov. 15, 2011, 7 pages.
Office Action dated Dec. 30, 2013 for U.S. Appl. No. 13/305,267, 10 pages.
Office Action dated Mar. 25, 2014 for U.S. Appl. No. 13/488,144, 60 Pages.
Interview Summary dated Feb. 3, 2014 for U.S. Appl. No. 13/188,136, 10 pages.
Rabinowitz, et al., A new positioning system using television synchronization signals, IEEE Transactions on Broadcasting, vol. 51(1), p. 51-61, Mar. 2005.
Office Action dated Apr. 8, 2014 for U.S. Appl. No. 13/175,199, 52 Pages.
Office Action dated Apr. 23, 2014 for U.S. Appl. No. 13/291,917, 29 Pages.
Office Action dated Apr. 22, 2014 for U.S. Appl. No. 13/447,069, 51 Pages.
Office Action dated May 14, 2014 for U.S. Appl. No. 13/660,689, 62pages.
Non-Final Office Action dated Jun. 6, 2014 for U.S. Appl. No. 13/447,072, 25 pages.
Office Action dated May 9, 2014 for U.S. Appl. No. 13/188,136, 33 pages.
Squires, "Practical Physics", Cambridge University Press, p. 12, 1986, 3 pages.
Represent (2000). In Collins English dictionary: Retrieved from http://search.credoreference.com/content/entry/hcengdict/represent/0, 2 pages.
Represent. (2001). In Chambers 21st century dictionary. Retrieved from http://search.credoreference.com/content/entry/chambdict/represent/O.
Represent. (2011). In The american heritage dictionary of the english language. Retrieved from http://search.credoreference.com/content/entry/hmdictenglang/represent/0.
Non-Final Office Action dated May 20, 2014 for U.S. Appl. No. 13/551,369, 29 pages.
Non-Final Office Action dated May 30, 2014 for U.S. Appl. No. 13/277,595, 49 pages.
Non-Final Office Action dated Jun. 3, 2014 for U.S. Appl. No. 13/523,770, 53 pages.
Office Action dated Jun. 18, 2014 for U.S. Appl. No. 13/305,276, 26 Pages.
Office Action dated Jun. 26, 2014 for U.S. Appl. No. 13/557,425, 24 Pages.
Office Action dated Jun. 30, 2014 for U.S. Appl. No. 13/305,267, 44 Pages.
Office Action dated Nov. 14, 2014 for U.S. Appl. No. 13/277,595, 74 pages.
Office Action dated Jan. 7, 2015 for U.S. Appl. No. 13/557,425, 30 pages.
Notice of Allowance dated Dec. 9, 2014 for U.S. Appl. No. 12/958,146, 48 pages.
Office Action dated Dec. 11, 2014 for U.S. Appl. No. 13/447,072, 28 pages.
Office Action dated Dec. 1, 2014 for U.S. Appl. No. 13/495,756, 76 pages.
Notice of Allowance dated Jan. 21, 2015 for U.S. Appl. No. 13/495,391, 98 pages.

\* cited by examiner

LOCATION ESTIMATION OF A MOBILE DEVICE IN A UMTS NETWORK

CROSS-REFERENCE TO RELATED APPLICATION

The subject application is a continuation of U.S. patent application Ser. No. 12/870,254, filed Aug. 27, 2010, and entitled "LOCATION ESTIMATION OF A MOBILE DEVICE IN A UMTS NETWORK", the disclosure of which is incorporated herein by reference in its entirety.

FIELD OF THE INVENTION

The present invention relates to mobile communication systems. In particular, the present invention relates to estimating a location of a mobile device in a UMTS network using crowd-sourced information.

BACKGROUND OF THE INVENTION

Mobile devices such as cellular telephones, PDAs, etc. are proliferating like never before. Almost everyone has some sort of mobile device, and some people have multiple devices. Users can access several different networks using a single mobile device, and can access voice, text, and multimedia data from other network entities such as servers and other mobile devices. Further, mobile device complexity is increasing, with more and more advanced and power efficient processors, display interfaces, and applications to provide a user experience like never before. Such devices include, for instance, the iPhone®, iPad®, Droid®, and other PDAs I netbooks.

These mobile devices additionally include Global Positioning System (GPS) receivers, which provides for a host of location-based services (LBS). Location estimation of mobile devices, in for instance a 3G UMTS system, is important for obtaining location tagged network failure data for system optimization, location based services, 911 services, and a variety of other location enhanced applications. Although GPS receivers enable precise location determinations, GPS receivers do not always receive satellite signals. This problem is highlighted in several situations, for instance in buildings, basements, or generally where the signal from a satellite is blocked for some reason. Estimating accurate (sub 100 m median accuracy) location of 3G mobile devices today typically consists of relying on Assisted (AGPS) devices to achieve the desired accuracy. The problem however, is that mobiles can only report AGPS location estimates if they actually see enough satellites, which essentially limits AGPS locates to mobiles which are "outdoors, in-vehicles or by windows". By some estimates this means that between 30-50% of mobile locates are not able to return AGPS location information.

Commonly owned and assigned patent application Ser. No. 12/712,424, now issued as U.S. Pat. No. 8,224,349, on Jul. 17, 2012 (the NELOS application), describes methods to determine a location of non-GPS mobile devices using network probes that measure timing offsets for base stations pairs and forwards these timing offsets to the mobile device to assist in a location determination. However, this relies on functionality on the network, which may not always be available to the mobile device. Further this does not allow for locating devices serviced by base station pairs that are not operated by the same network operator that owns the network servers.

Consequently, what is needed is a technique to determine a location of a non-GPS mobile device to a precise degree without relying on unnecessary intelligence on the network.

SUMMARY OF THE INVENTION

The present invention provides devices, systems, and methods to utilize relative timing offset information reported by one or more mobile devices. When coupled with AGPS information reported by one or more mobile devices, the offset information is be used to calibrate calculations and subsequently to locate all 3G mobiles with GPS-like accuracy, whether or not a GPS receiver is available on said mobile device being located. A similar approach is used in the NELOS (Network Event LOcation System), described in commonly-owned U.S. patent application Ser. No. 12/712,424, now issued as U.S. Pat. No. 8,224,349, on Jul. 17, 2012 (the NELOS patent), the contents of which are hereby incorporated by reference in their entirety herein in this disclosure. Briefly, signal path compensation is effected through determination of a propagation delay between one or more cell sites and a mobile device. Such determination is based, at least in part, on statistical analysis of the location of mobile devices throughout a coverage sector or cell. Known information about the base stations is used to calibrate unknown intonation such as a timing offset, to improve the accuracy of a detected location. If any given mobile device is at a particular location, a network operator's base stations are at known locations in tens of latitudes and longitudes, etc. The mobile device measures a timing delay from any given base station. The timing delay is a function of the propagation delay as well as of the timing offset of the base stations The objective is to solve for the timing offset of the base stations. The NELOS application uses known information generated from mobile devices at known locations. For instance, if a mobile device is aware of their location (via GPS, for instance), and measures the timing offsets, one can determine a propagation delay from the known base stations, and can solve for a relative timing offset. The relative timing offset can be applied to determine a location for all other mobile devices within the area served by the known base station. The present invention utilizes this method in conjunction with information crowd-sourced from a plurality of mobile devices instead of using the information available at the network. Applying the same calculations and calibration methodology solely to handset reported data is a significant improvement over existing technology as it is independent of the need for any network data, and as such can be deployed by companies, phone vendors, or other entities without the need to interact with a network operator.

In one exemplary embodiment, the present invention is a method for determining a location of mobile devices served by a base station pair, the method including receiving a first timing difference of the base station pair from a first mobile device on the network, the first timing difference including a propagation delay determined from a Global Positioning System (GPS) satellite in communication with the first mobile device, determining a timing offset of the base station pair based in part upon the timing different, and in part upon a known location of the base station pair, receiving a second timing difference of the base station pair from a second mobile device on the network, wherein the second mobile device is unable to communicate with a GPS satellite, transmitting a timing offset of the base station pair to the second mobile device, and triangulating a plurality of signals from at least the base station pair and another base station to determine a location of the second mobile device. The method further includes triggering the first mobile device to transmit the first timing difference and the propagation delay. The method further includes receiving a plurality of timing difference reports from a plurality of mobile devices.

In another exemplary embodiment, the present invention is a system for intelligent selection of a Wi-Fi access point from a mobile device, the system including a first mobile device in communication with a GPS satellite, a second mobile device that is unable to communicate with a GPS satellite, a pair of base stations that provide access to a mobile network for both first and second mobile devices, a server on the mobile network, the server including logic to receive a first timing difference of the base station pair from the first mobile device, the first timing difference including a propagation delay determined from the GPS satellite, determine a timing offset of the base station pair based in part upon the timing difference, and in part upon a known location of the base station pair, receive a second timing difference of the base station pair from the second mobile device, and transmit the timing offset of the base station pair to the second mobile device, wherein the second mobile device uses the received timing offset and triangulates a plurality of signals from at least the base station pair and another base station to determine a location for the second mobile device. The system further includes a database on the server that includes a plurality of known locations for a plurality of base stations pairs operated by a network operator. The base station pair may be operated by a third party network operator.

In yet another exemplary embodiment, the present invention is a device for assisting in determining a location of a plurality of mobile devices on a network, the device including a processor, a memory coupled to the processor, a network interface coupled to the processor, a GPS transceiver coupled to the processor, and logic on the memory to measure a first timing difference of the base station pair and a propagation delay determined from a GPS satellite, transmit the first timing difference and the propagation delay to along with a location of the device to a server on the network, wherein the server computes a timing offset of the base station pair based in part upon the timing difference, and in part upon a known location of the base station pair and wherein a second mobile device receives the timing offset, and uses the timing offset with a second timing difference measured at the second mobile device to determine a location of the second mobile device. The second mobile device uses the received timing offset and triangulates a plurality of signals from at least the base station pair and another base station to determine the location for the second mobile device. A user interface enables a user to determine a location of the mobile device, and transmit the location along with the measured timing difference and propagation delay to the server.

DETAILED DESCRIPTION OF THE INVENTION

Figure 1:
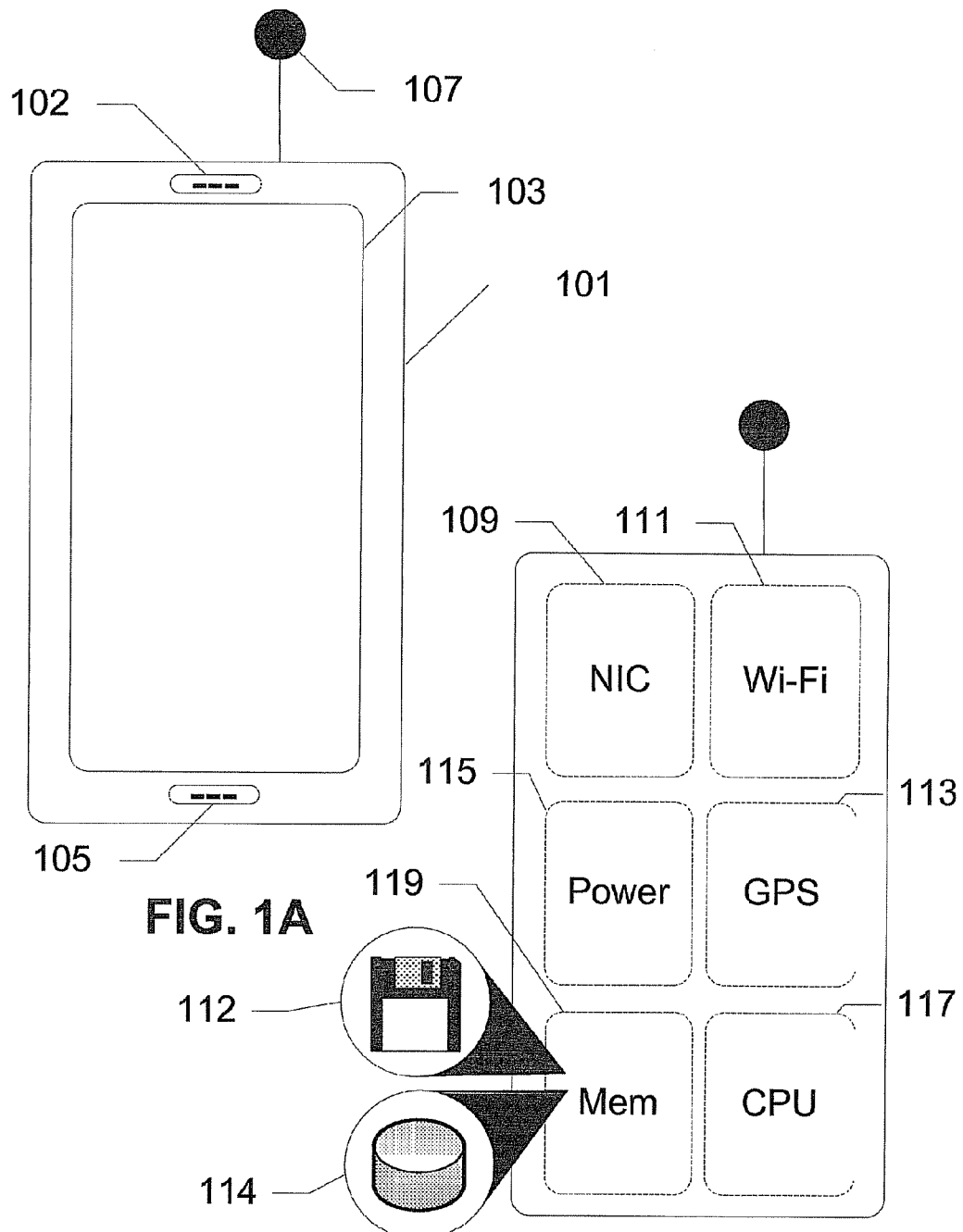
FIGS. 1A and 1B respectively show the external and internal components of a mobile device, according to an exemplary embodiment of the present invention.

The present invention provides devices, systems, and methods to utilize relative timing offset information reported by one or more mobile devices. When coupled with AGPS information reported by one or more mobile devices, the offset information is be used to calibrate calculations and subsequently to locate all 3G mobiles with GPS-like accuracy, whether or not a GPS receiver is available on said mobile device being located. A similar approach is used in the NELOS (Network Event LOcation System), described in commonly-owned U.S. patent application Ser. No. 12/712,424, now issued as U.S. Pat. No. 8,224,349. on Jul. 17, 2012 (the NELOS patent). Briefly, signal path compensation is effected through determination of a propagation delay between one or more cell sites and a mobile device. Such determination is based, at least in part, on statistical analysis of the location of mobile devices throughout a coverage sector or cell. Known information about the base stations is used to calibrate unknown information such as a timing offset, to improve the accuracy of a detected location. If any given mobile device is at a particular location, a network operator's base stations are at known locations in terms of latitudes and longitudes, etc. The mobile device measures a timing delay from any given base station. The timing delay is a function of the propagation delay as well as of the timing offset of the base stations. The objective is to solve for the timing offset of the base stations. The NELOS application uses known information generated from mobile devices at known locations. For instance, if a mobile device is aware of their location (via GPS, for instance), and measures the timing offsets, one can determine a propagation delay from the known base stations, and can solve for a relative timing offset. The relative timing offset can be applied to determine a location for all other mobile devices within the area served by the known base station. The present invention utilizes this method in conjunction with information crowd-sourced from a plurality of mobile devices instead of using the information available at the network. Applying the same calculations and calibration methodology solely to handset reported data is a significant Improvement over existing technology as it is independent of the need for any network data, and as such can be deployed by companies, phone vendors, or other entities without the need to interact with a network operator.

"Mobile device", as used herein and throughout this disclosure, refers to any electronic device capable of wirelessly sending and receiving data. A mobile device may have a processor, a memory, a transceiver, an input, and an output. Examples of such devices include cellular telephones, personal digital assistants (PDAs), portable computers, etc. The memory stores applications, software, or logic. Examples of processors are computer processors (processing units), microprocessors, digital signal processors, controllers and microcontrollers, etc. Examples of device memories that may comprise logic include RAM (random access memory), flash memories, ROMS (read-only memories), EPROMS (erasable programmable read-only memories), and EEPROMS (electrically erasable programmable read-only memories).

"Logic" as used herein and throughout this disclosure, refers to any information having the form of instruction signals and/or data that may be applied to direct the operation of a processor. Logic may be formed from signals stored in a device memory. Software is one example of such logic. Logic may also be comprised by digital and/or analog hardware circuits, for example, hardware circuits comprising logical AND, OR, XOR, NAND, NOR, and other logical operations. Logic may be formed from combinations of software and hardware. On a network, logic may be programmed on a server, or a complex of servers. A particular logic unit is not limited to a single logical location on the network.

Mobile devices communicate with each other and with other elements via a network, for instance, a wireless network, or a wireline network. A "network" can include broadband wide-area networks such as cellular networks, local-area networks (LAN), wireless LAN (Wi-Fi), and personal area networks, such as near-field communication (NFC) networks including BLUETOOTH®. Communication across a network is preferably packet-based; however, radio and frequency/amplitude modulations networks can enable communication between communication devices using appropriate analog-digital-analog converters and other elements. Communication is enabled by hardware elements called "transceivers." Mobile devices may have more than one transceiver, capable of communicating over different networks. For example, a cellular telephone can include a cellular transceiver for communicating with a cellular base station, a Wi-Fi transceiver for communicating with a Wi-Fi network, and a BLUETOOTH® transceiver for communicating with a BLUETOOTH® device.

A network typically includes a plurality of elements that host logic for performing tasks on the network. The logic can be hosted on servers. In modern packet-based wide-area networks, servers may be placed at several logical points on the network. Servers may further be in communication with databases and can enable communication devices to access the contents of a database. Billing servers, application servers, etc. are examples of such servers. A server can include several network elements, including other servers, and can be logically situation anywhere on a service provider's network, such as the back-end of a cellular network. A server hosts or is in communication with a database hosting an account for a user of a mobile device. The "user account" includes several attributes for a particular user, including a unique identifier of the mobile device(s) owned by the user, relationships with other users, application usage, location, personal settings, business rules, bank accounts, and other information. A server may communicate with other servers on different networks to update a user account.

A "location", as used herein and throughout this disclosure, is any physical location that is served by one or more networks. A mobile device has a "location" that can be determined via a plurality of methods such as Global Positioning System (GPS), Assisted GPS (A-GPS), cell tower triangulation, RF signatures, etc. and as described below. A lane on a road can be a location. A toll booth can be a location. A location may include a geo-fence. A geo-fence is a virtual perimeter around a location such that when a smart vehicle enters or exits the location, a notification is generated. A location can generally be determined using radio-location via signal measurement from base stations/cell towers, using GPS/A-GPS, or using proximity to NFC transceivers. Determining a location as a function of time enables a measurement of rate of movement, or speed.

For the purposes of the present invention, the terms cell tower, cell site, base station, and nodeB are used interchangeably and generally refer to an access point that provides access to the cellular network for a mobile device having a cellular transceiver.

For the following description, it can be assumed that most correspondingly labeled structures across the figures (e.g., 132 and 232, etc.) possess the same characteristics and are subject to the same structure and function. If there is a difference between correspondingly labeled elements that is not pointed out, and this difference results in a non-corresponding structure or function of an element for a particular embodiment, then that conflicting description given for that particular embodiment shall govern.

FIGS. 1A and 1B respectively show the external and internal components of a mobile device, according to an exemplary embodiment of the present invention. Mobile device 101 includes a speaker 102, a display 103, a microphone 105, and an antenna 107. Mobile device 101 further includes a network interface (NIC) 109, a Wi-Fi transceiver 111, a Global Positioning System (GPS) receiver 113, a power supply 115, a central processing unit (CPU) 117, and a memory 119. Speaker 102 provides an audio output for mobile device 101. Display 103 is an LCD or LED or other type of display on which a user can view selections, numbers, letters, etc. Display 103 can also be a touchscreen, thereby being used as an input device. In embodiments not using a touchscreen, a keypad is typically used as an input device, for instance, to type a phone number or a message. Such a keypad may be a numerical keypad, a QWERTY keyboard, etc. Microphone 105 allows the user to verbally communicate with others using mobile device 101. Antenna 107 is a transducer designed to transmit or receive electromagnetic waves to and from a network. In conjunction with antenna 107, network interface 109 allows mobile device 101 to wirelessly communicate with a cellular network, or with other wireless devices across the cellular network. Network interface 109 may be a cellular transceiver, wireless transceiver, etc., and includes combinations of transceivers to communicate with assorted wireless networks. Wi-Fi transceiver 111 enables mobile device 101 to wirelessly communicate over short ranges with a Wi-Fi access point, and through the access point, to a packet-based network such as the Internet, and other devices on the Internet. GPS transceiver 113 enables a determination of a location of mobile device 101, by receiving signals from a GPS satellite. In addition to these signals, network interface 109 can receive assistance data from an A-GPS server on the cellular network, thereby enabling GPS receiver 113 to get a faster "fix" on a satellite signal. Power supply 115 provides power to each of the components of mobile device 101, and can include a battery, as well as an interface to an external power supply. CPU 117 controls components of mobile device 101 according to instructions in logic stored on memory 119. Memory 119 comprises any computer readable medium, such as RAM, ROM, etc. Memory 119 stores logic 112, in addition to logic for operating the components of mobile device 101. Memory 119 further stores a database 114 including a record for base station pairs and their associated timing offsets. This database is useful for estimating a location that mobile device 101 has already been in, so as to minimize the load on the network to download additional timing offsets that are not required. Further, the record of base station pairs may include timing differences to be uploaded to a server at a later time or as and when required.

Logic 112 includes measuring logic to measure a timing delay from any given base station. The timing delay is a function of the propagation delay as well as of the timing offset of the base stations. The objective is to solve for the timing offset of the base stations. For instance, if mobile device 101 is aware of their location (via signals received at GPS receiver 113, for instance), and measures the timing offsets, one can determine a propagation delay from the known base stations, and can solve for a relative timing offset. The relative timing offset can be applied to determine a location for all other mobile devices within the area served by the known base station. The present invention utilizes this method in conjunction with information crowd-sourced from a plurality of mobile devices. The calculation is as follows. Logic 112 observes an Observed Time Difference (OTD) measurement from a particular cell i that is a function of a measurement of a received Superframe number $SFN_t$ to its Connection Frame Number (CFN) measured in chips. More detail about these values can be found in 3G Partnership Project Technical Spec 25.215-830, section 5.1.8, "SFN-CFN observed time difference," hereinafter referred to as 3gpp01.

$$OTD_i = OFF_i * 38,400 + T_{mi} = SFN_i - CFN \quad (1)$$

In equation (1), $OFF_i$ is the measured $SFN_t$ to CFN offset in frames, and $T_{mi}$ is the offset in chips, both of which are measurements available to mobile device 101 with respect to a cell i. The right hand side of equation (1) is a function of the transport and propagation delay, so that equation (1) can be written as (see, for instance, 3gpp01):

$$OTD_i = T_{ve} - (T_i + \tau_i) \quad (2)$$

Where $T_{ve}$ denotes the time reference at a mobile device, $T_i$ denotes the transport offset for cell i to the mobile device, and $\tau_i$ denotes the propagation delay for cell i. Consequently, for two cells i and j and a given mobile device m1 we have:

$$OTD_i(m1) = T_{ve}(m1) - (T_i + \tau_i(m1))$$

$$OTD_j(m1) = T_{ve}(m1) - (T_j + \tau_j(m1))$$

So that, $$OTD_j(m1) - OTD_i(m1) = T_i - T_j + \tau_i(m1) - \tau_j(m1) \quad (3)$$

If $O_{ji}(m)$ denotes the time difference in the arrivals of signals from cells i and j, as observed by a mobile device m (i.e., $O_{ji}(m) = OTD_j(m) - OTD_i(m)$), then $$O_{ji}(m1) = T_{ij} + \tau_{ij}(m1) \quad (4)$$

In equation (4), both $T_{ij}$ and $\tau_{ij}(m1)$ are unknown. At this point, a mobile device m2 which happens to also be between the same two base stations, i and j, which also has AGPS measurements reported (for instance, mobile device 101 receiving GPS signals), the provision of $\tau_{ij}(m2)$ allows one to calculate $T_{ij}$ as $$T_{ij} = O_{ji}(m2) - \tau_{ij}(m2). \quad (5)$$

$T_{ij}$ is common to all mobile devices between base stations i and j, so that, as long as one AGPS measurement can be captured from mobile device 101, it can be used to calculate ("calibrate") the $T_{ij}$ component common to all mobile devices between these two base stations, and a location for all the mobile devices can be calculated with the same AGPS accuracy. This calculation can occur on a server on the network.

Pursuant to any prior contractual arrangement between a user of mobile device 101 and the network operator, logic on the network (on an application server, for instance) has the ability operate GPS receiver 113 and to command/request, for instance, a "snapshot" of the location of mobile device 101. This provides a network operator or other entity the ability to dynamically determine locations of devices that are accessing the various network access points. The resulting reports can be used to generate a "map" of Wi-Fi coverage for the network. Combined with information on RF fingerprinting of cell sites described in the NELOS patent, this offers a network operator with a heightened level of awareness as to how different aspects of their network are operating.

As described above, provided a mobile device has access to a GPS satellite, there is no need to obtain better accuracy (i.e. $\tau_{ij}$ is known from AGPS), however, good location estimation is needed when mobile devices do not have access to satellites. This requires accurately calculating the propagation delays ($\tau_{ij}$) for a given mobile device. In one exemplary embodiment, $\tau_{ij}$ can be calculated using a self-calibrating approach. At one point in time, say before walking into a building from the parking lot, a mobile device has access to AGPS location information, as well as visibility to the same cell sites. Assuming the mobile device captured the AGPS information when it had it, and that it knows the base station/cell locations as described above, (i.e., it has $\tau_{ij}$), and it measured $O_{ji}$ at the same time, then $T_{ij}$ could have been stored in the database 114, using Equation (5). Consequently, when the mobile device loses AGPS thereafter (e.g. the user moves inside the building), all that logic 112 needs to do is to use the stored $T_{ij}$ along with $O_{ji}$ in Eqn. (5) to calculate $\tau_{ij}$. Now, if the mobile device can do this similarly for another base station pair, then standard triangulation approaches known in the art can be used to locate the mobile geographically.

Moreover, the present invention also provides for a crowd-sourced approach. At least one mobile device per base station shares relevant AGPS and $O_{ji}$, or computed $T_{ij}$ via Eqn (5) information when available to a central server. Then, mobile devices that do not have AGPS, and need an estimate of $T_{ij}$, can query the central server to collect the shared $T_{ij}$ database, and then these mobile devices can use Eqn (5) to calculate $\tau_{ij}$, and hence using another base station pair to perform triangulation.

Figure 2:
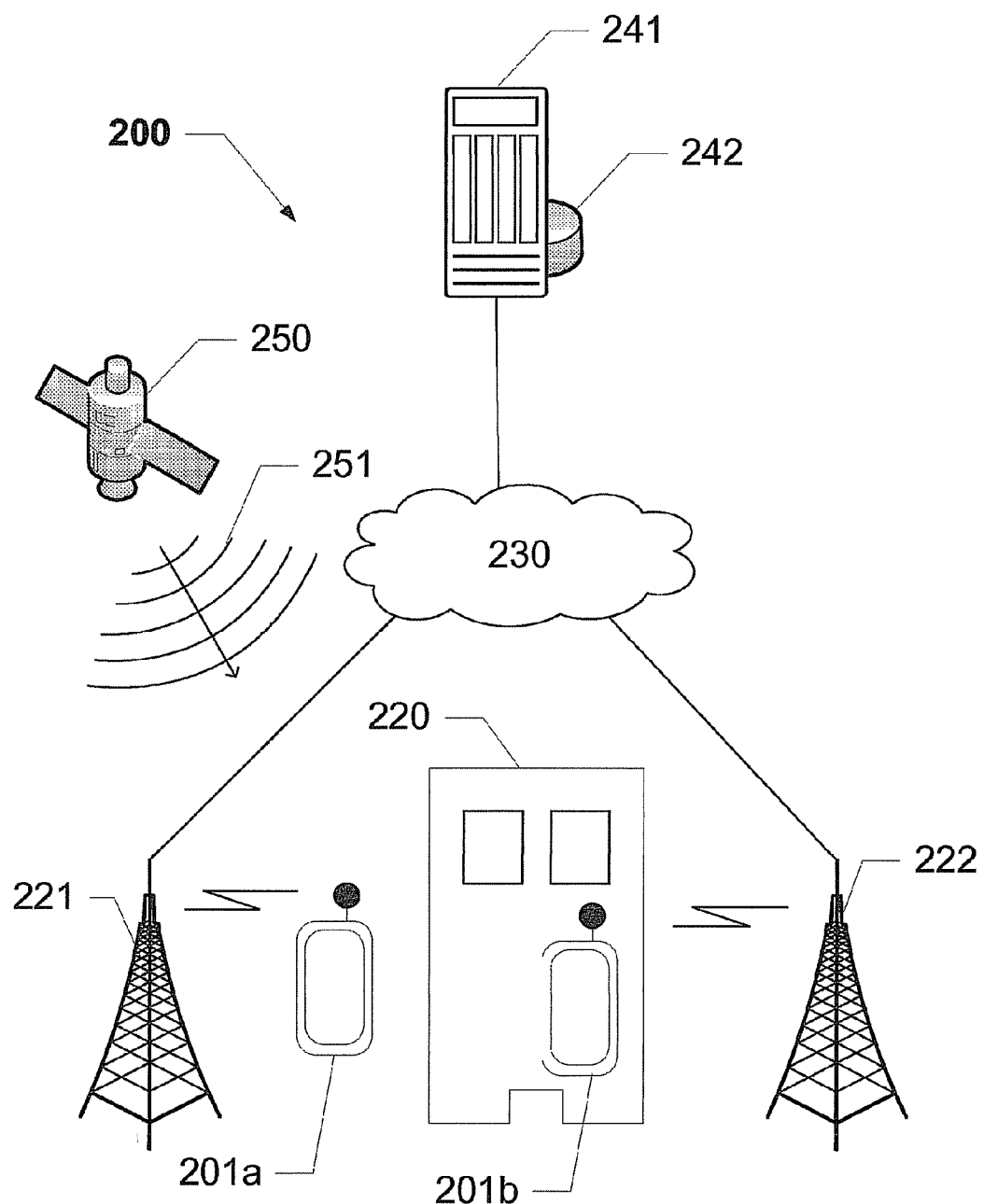
FIG. 2 shows a system for determining the location of a mobile device, according to an exemplary embodiment of the present invention.

FIG. 2 shows a system 200 for determining a location of a mobile device, according to an exemplary embodiment of the present invention. Mobile devices 201a and 201b are served by a pair of base stations/cell sites 221 and 222. However, mobile device 201b is inside building 220, and therefore is unable to receive a satellite signal 251 from satellite 250. Mobile device 201a is able to receive satellite signal 251. Cell sites 221 and 222 provide network access to cellular network 230. Other elements of cellular network 230 are known in the art and therefore not described, such as routers, gateways, nodes, and other servers. At a back end of cellular network 230 is a server 241, such as an application server, or location server. Server 241 includes storage 242 that stores, among other things, logic, and a database of known locations for cell sites 221 and 222.

In operation, mobile device 201a, using AGPS, provides critical timing measurements $T_{ij}$ to server 241 for a given cell site pair 221, 222, while mobile device 201b receives the timing information $T_{ij}$ from server 241 via network 230 in order to accurately calculate its location. For this method to work, it is assume that server 241 has $T_{ij}$'s for every base station pair i and j. There are a variety of ways to do this, including receiving reports from mobile devices of the computed $T_{ij}$ or equivalent, every time they a base station pair is connected to, while having access to AGPS. This reporting could be initiated by a command from server 241, or pre-programmed into logic on the mobile device itself to periodically report $T_{ij}$ for a base station pair. The server 241 acts as a central repository of $T_{ij}$ values for base stations pairs and is regularly updated and queried by "cooperating mobile devices". As mentioned earlier, these same $T_{ij}$ values are used to "calibrate" NELOS, which in then turn uses reported $O_{ji}$ values measured from the network probes to locate all 3G mobiles. However, if an AGPS measurement for a given base station pair ij, is not available, then server 241 requests AGPS measurement from a mobile device such as device 201a in the vicinity of the base station pair ij, so that it can calculate $T_{ij}$ for reference in its database.

There are a variety of ways to calculate relevant base station locations, either via brute force, driving around, and using signal strength/time delay triangulation to locate them, using a lookup of public database, or a crowd sourced approach. In the crowd sourced approach of the present invention, multiple AGPS measurements coupled with $\tau_{ij}$ measurements from multiple mobiles are available. This presents an "inverse problem" for finding the locations of the base stations, and can be solved as follows. Continuing from Equations (4) and (5) above, for a large collection of mobiles $m_1, m_2, m_3, m_4, \ldots, m_N$ with random (but known and distinct) geographical positions, one can derive the following system of relations:

$$O_{ji}(m_1) = T_{ij} + \tau_{ij}(m_1)$$

$$O_{ji}(m_2) = T_{ij} + \tau_{ij}(m_2)$$

$$\vdots$$

$$O_{ji}(m_N) = T_{ij} + \tau_{ij}(m_N)$$

Denoting the velocity of propagation of light by $\underline{c}$, the above relations may be expressed in terms of the differential distances as shown below.

$$d_{ij}(m_1) = Q_{ji}(m_1) - R_{ij} \quad (6)$$

$$d_{ij}(m_2) = Q_{ji}(m_2) - R_{ij}$$

$$\vdots$$

$$d_{ij}(m_N) = Q_{ji}(m_N) - R_{ij}$$

where $Q_{ji}(m_l) = \underline{c} \times O_{ji}(m_l)$, $l=1, \ldots, N$ are a set of known parameters, and $R_{ij} = \underline{c} \times T_{ij}$ is an unknown. This leads to the following (possibly over-determined) set of N relations:

$$\sqrt{(x_i - x_{m_2})^2 + (y_i - y_{m_2})^2} - \sqrt{(x_j - x_{m_2})^2 + (y_j - y_{m_2})^2} = \quad (7)$$
$$Q_{ji}(m_1) - R_{ij}$$

$$\sqrt{(x_i - x_{m_3})^2 + (y_i - y_{m_3})^2} - \sqrt{(x_j - x_{m_3})^2 + (y_j - y_{m_3})^2} =$$
$$Q_{ji}(m_2) - R_{ij}$$

$$\vdots$$

$$\sqrt{(x_i - x_{m_N})^2 + (y_i - y_{m_N})^2} - \sqrt{(x_j - x_{m_N})^2 + (y_j - y_{m_N})^2} =$$
$$Q_{ji}(m_N) - R_{ij}$$

where $(x_\_, y_\_)$ designate the geographical location of the mobile device in question (approximated in the Cartesian coordinate system). Note that barring the five unknowns $\{x_i, y_i, x_j, y_j, R_{ij}\}$, all the other parameters in the above system of relations are known. The objective here is to compute a least mean squared estimate for the unknowns $\{x_i, y_i, x_j, y_j, R_{ij}\}$. Thus, for a candidate choice of the unknown vector $[x_i, y_i, x_j, y_j, R_{ij}]$, an error function E is defined as $$E(x_i, y_i, x_j, y_j, R_{ij}) = \sum_{i=1}^{N} \left[ \begin{array}{c} \sqrt{(x_i - x_{m_i})^2 + (y_i - y_{m_i})^2} - \\ \sqrt{(x_j - x_{m_i})^2 + (y_j - y_{m_i})^2} - \\ (Q_{ji}(m_i) - R_{ij}) \end{array} \right]^2 \quad (8)$$

Assuming convexity of the function $E(x_i, y_i, x_j, y_j, R_{ij})$, the optimal values of the unknowns $\{x^*_i, y^*_i, x^*_j, y^*_j, R^*_{ij}\}$ that minimize the error is obtained by the set of relations, $$\frac{\partial E}{\partial x_i^*} = 0; \frac{\partial E}{\partial y_i^*} = 0; \frac{\partial E}{\partial x_j^*} = 0; \frac{\partial E}{\partial y_j^*} = 0; \frac{\partial E}{\partial R_{ij}^*} = 0 \quad (9)$$

This leads to the following system of five non-linear equations in five unknowns:

$$\sum_{i=1}^{N} \left\{ \left[ 1 - \frac{(x_i^* - x_{m_i})}{\sqrt{(x_i^* - x_{m_i})^2 + (y_i^* - y_{m_i})^2}} \right] \right\} = 0 \quad (10)$$

$$\sum_{i=1}^{N} \left\{ \left[ 1 - \frac{Q_{ji}(m_i) - R_{ij}^* + \sqrt{(x_j^* - x_{m_i})^2 + (y_j^* - y_{m_i})^2}}{\sqrt{(x_i^* - x_{m_i})^2 + (y_i^* - y_{m_i})^2}} \right] \right\} = 0$$

$$\sum_{i=1}^{N} \left\{ \left[ 1 - \frac{(y_i^* - y_{m_i})}{\sqrt{(x_i^* - x_{m_i})^2 + (y_i^* - y_{m_i})^2}} \cdot \frac{Q_{ji}(m_i) - R_{ij}^* + \sqrt{(x_j^* - x_{m_i})^2 + (y_j^* - y_{m_i})^2}}{} \right] \right\} = 0$$

$$\sum_{i=1}^{N} \left\{ \left[ 1 + \frac{(x_j^* - x_{m_i})}{\sqrt{(x_j^* - x_{m_i})^2 + (y_j^* - y_{m_i})^2}} \cdot \frac{Q_{ji}(m_i) - R_{ij}^* - \sqrt{(x_i^* - x_{m_i})^2 + (y_i^* - y_{m_i})^2}}{} \right] \right\} = 0$$

$$\sum_{i=1}^{N} \left\{ \left[ 1 + \frac{(y_j^* - x_{m_i})}{\sqrt{(x_j^* - x_{m_i})^2 + (y_j^* - y_{m_i})^2}} \cdot \frac{Q_{ji}(m_i) - R_{ij}^* - \sqrt{(x_i^* - x_{m_i})^2 + (y_i^* - y_{m_i})^2}}{} \right] \right\} = 0$$

$$\sum_{i=1}^{N} \left[ \frac{\sqrt{(x_i^* - x_{m_i})^2 + (y_i^* - y_{m_i})^2} -}{\sqrt{(x_j^* - x_{m_i})^2 + (y_j^* - y_{m_i})^2} - (Q_{ji}(m_i) - R_{ij}^*)} \right] = 0$$

This system of equations (10) may be solved via a technique such as the Newton-Raphson method, to yield the least mean squared error estimates for the geographical locations of the cell sites i and j, $\{x^*_i, y^*_i, x^*_j, y^*_j, R^*_{ij}\}$.

Figure 3:
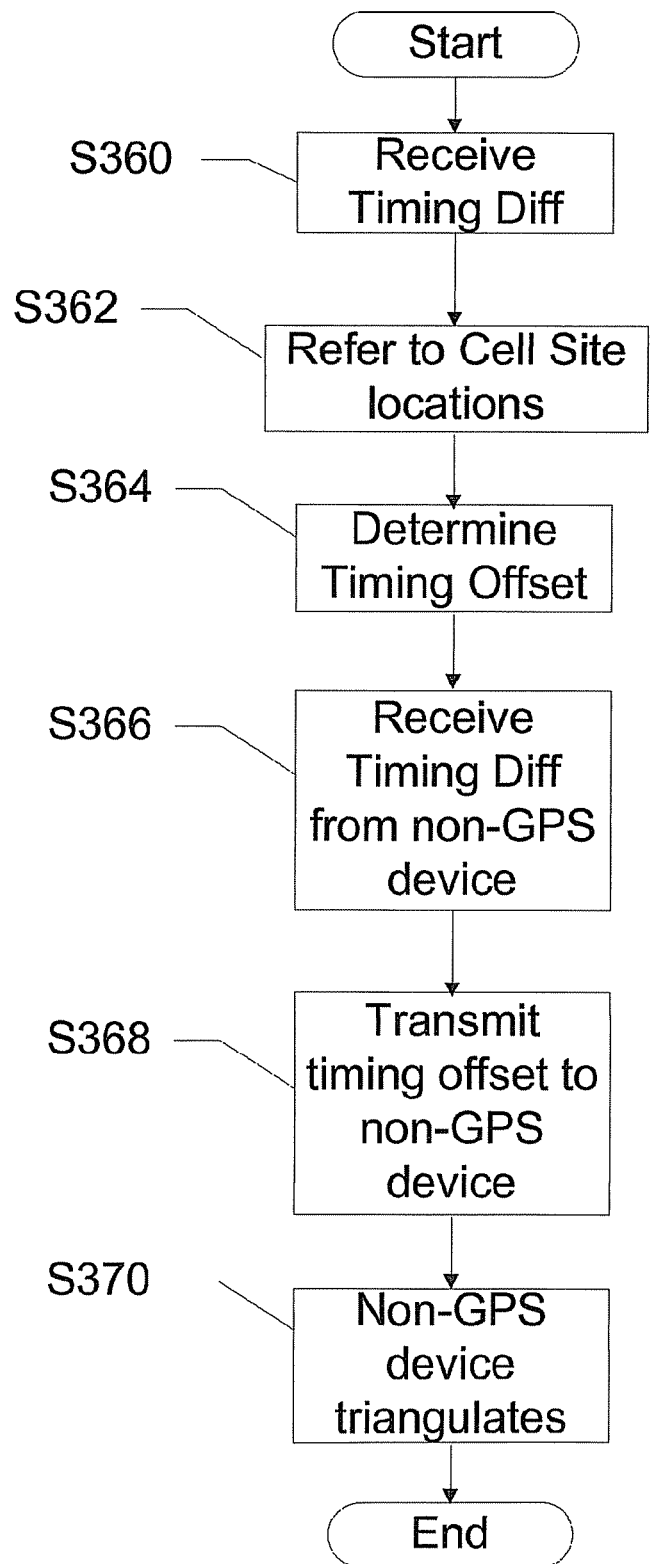
FIG. 3 shows a method for determining the location of a mobile device, according to an exemplary embodiment of the present invention.

FIG. 3 shows a method for determining a location of a mobile device, according to an exemplary embodiment of the present invention. As described above, a logic on either the mobile device or the network triggers the transmission S360 of a first timing difference of the base station pair from a first mobile device on the network, the first timing difference including a propagation delay determined from a Global Positioning System (GPS) satellite in communication with the first mobile device. The server refers to cell site locations S362 stored on a local database, or additionally reported by a plurality of mobile devices or other network nodes, to determine S364 a timing offset of the base station pair based in part upon the timing difference, as shown in the equations above. The server receives a second timing difference S366 of the base station pair from a second mobile device on the network, wherein the second mobile device is unable to communicate with a GPS satellite for any number of reasons identified above. The server transmits a timing offset of the base station pair to the second mobile device S368, wherein the second mobile devices triangulates S370 a plurality of signals from at least the base station pair and another base station to determine a location of the second mobile device. Optionally, the first mobile device may be triggered to transmit the first timing difference and the propagation delay at fixed or specified intervals. Optionally, a Newton-Raphson method can be employed as described above to yield a geographical location of the cell site pair.

According to embodiments of the present invention, updating the cellular network may also send the network an RF fingerprint for the current location of the mobile device, this location being determined through GPS, etc. The cellular network can update databases on servers with this new information to make further determinations of location more accurate, especially for devices lacking GPS capabilities. Further, the intelligence may take into account a subscriber density, or a number of subscribers per cell sector, and use this information to balance the load between cell towers. The logic can be on a server on the network, on the mobile devices themselves, and any combination thereof. Moreover, a network operator can partner with a third party network operator or service provider, whereby the third party installs a reporting and detection application on a mobile device. The application would enable the mobile device to report O and T values to the network operator's server, regardless of which base station/cell tower pair the mobile device is connected to. This helps to calibrate Using locations of the cell sites, a triangulation method can be employed in conjunction with the reported O and T values to determine a more specific location for other mobile devices served by the base station pair. Other combinations are possible and will be apparent to one skilled in the art in light of this disclosure.

The foregoing disclosure of the preferred embodiments of the present invention has been presented for purposes of illustration and description. It is not intended to be exhaustive or to limit the invention to the precise forms disclosed. Several variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

The invention claimed is:

1. A method, comprising:
   receiving, by a first mobile device comprising a processor, timing offset information for a base station device pair of devices comprising a first base station device and a second base station device, wherein the timing offset information is relative to a second mobile device based on a difference between first measured timing difference information and computed timing difference information, the first measured timing difference information is based on a measured propagation time between the devices of the base station device pair and the second mobile device, and the computed timing difference information is based on a geometrically determined time between a determined location of the second mobile device, a determined location of the first base station device, and determined location of the second base station device;
   receiving, by the first mobile device, second measured timing difference information based on a measured propagation time between the devices of the base station device pair and the first mobile device; and
   determining, by the first mobile device, a location of the first mobile device based on the timing offset information for the base station device pair and the second measured timing difference information.

2. The method of claim 1, wherein the receiving the timing offset information comprises receiving a set of timing offset information for a set of base station device pairs relative to a set of mobile devices, the set of base station device pairs comprising base station device pairs that are associated with respective coverage areas serving the location of the first mobile device.

3. The method of claim 2, further comprising storing, at the first mobile device, at least a portion of the set of timing offset information.

4. The method of claim 2, wherein the set of mobile devices comprises the second mobile device and at least one other mobile device and does not include the first mobile device.

5. The method of claim 2, wherein the set of base station device pairs comprises the first base station device, the second base station device, and at least one other base station device.

6. The method of claim 5, wherein the set of base station device pairs comprise a plurality of base station pairs each comprising the first base station device.

7. The method of claim 1, wherein the receiving the second measured timing difference comprises receiving via a receiver other than a cellular radio receiver of the first device.

8. The method of claim 1, wherein the receiving the second measured timing difference comprises receiving via a receiver other than a wireless local area network radio receiver of the first device.

9. A system comprising:
   a memory to store instructions; and
   a processor, coupled to the memory, that facilitates execution of the instructions to perform operations, comprising:
      receiving global positioning system information for a first mobile device;
      receiving first measured timing difference information associated with a measured propagation delay of a signal between a base station device pair, comprising a first base station device and a second base station device associated with a network, and the first mobile device;
      determining timing offset information for the base station device pair based on the first measured timing difference information, the global positioning system information for the first mobile device, and defined locations of the first base station device and the second base station device; and
      facilitating access to the timing offset information by a second mobile device to facilitate a determination of a location for the second mobile device based in part on the timing offset information for the base station device pair and a second measured timing difference information associated with another measured propagation delay of another signal between the base station device pair and the second mobile device.

10. The system of claim 9, wherein the receiving the timing offset information comprises receiving a set of timing offset information, the set of timing offset information comprising the timing offset information, for a set of base station device pairs relative to a set of mobile devices, the set of base station device pairs comprising base station device pairs each associated with coverage areas serving the location of the first mobile device.

11. The system of claim 10, wherein the facilitating the access to the timing offset information further facilitates storage of at least a portion of the set of timing offset information by the second mobile device.

12. The system of claim 10, wherein the set of mobile devices comprises the first mobile device and at least one other mobile device, and does not include the second mobile device.

13. The system of claim 10, wherein the set of base station device pairs comprises a first base station device, a second base station device, and at least one other base station device.

14. The system of claim 13, wherein the set of base station device pairs comprise a plurality of base station pairs each comprising the first base station device.

15. The system of claim 9, wherein the receiving second measured timing difference comprises receiving a modality other than a cellular radio of the first device.

16. A mobile device, comprising:
a memory to store instructions; and
a processor, coupled to the memory, that facilitates execution of the instructions to perform operations, comprising:
receiving first measured timing difference information between a base station device pair, comprising first and second base station devices, and another mobile device, the first timing difference information comprising a measured propagation delay for a signal transmitted between the other mobile device and the first and second base station devices comprising the base station device pair;
receiving base station device pair location information for known locations of the first and second base station devices comprising the base station device pair;
receiving location information for the other mobile device;
determining predicted timing difference information between the base station device pair and the other mobile device based on the base station device pair location information and the location information for the other mobile device;
determining timing offset information of the base station device pair based on the first measured timing difference information and the predicted timing difference information; and
determining a location for the mobile device based on the timing offset information and second measured timing difference information measured between the mobile device and the base station device pair.

17. The mobile device of claim 16, the operations further comprising receiving a set of timing offset information for a set of base station device pairs relative to a set of mobile devices, the set of base station device pairs comprising base station device pairs each associated with coverage areas serving the location of the other mobile device.

18. The mobile device of claim 16, wherein the receiving first measured timing difference information employs receiving via a receiver other than a cellular radio receiver of the mobile device.

19. The mobile device of claim 16, wherein the receiving first measured timing difference information employs receiving via a receiver other than a wireless local area network radio receiver of the mobile device.

20. The mobile device of claim 16, wherein the receiving first measured timing difference information employs receiving via a receiver other than a near field communication radio receiver of the mobile device.

\* \* \* \* \*